(12) United States Patent
Gumpoltsberger

(10) Patent No.: US 7,500,411 B2
(45) Date of Patent: Mar. 10, 2009

(54) TRANSMISSION STRUCTURE

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 914 days.

(21) Appl. No.: 10/946,503

(22) Filed: Sep. 21, 2004

(65) Prior Publication Data

US 2008/0141808 A1    Jun. 19, 2008

(30) Foreign Application Priority Data

Sep. 23, 2003    (DE) ................................. 103 43 995

(51) Int. Cl.
*F16H 3/08* (2006.01)
(52) U.S. Cl. .......................................... 74/329; 74/331
(58) Field of Classification Search .................. 74/325, 74/329, 330, 331
See application file for complete search history.

(56) References Cited

U.S. PATENT DOCUMENTS

| | | | |
|---|---|---|---|
| 760,460 A | 5/1904 | Leighton | |
| 3,434,366 A | 3/1969 | Raso et al. | |
| 4,041,791 A * | 8/1977 | Coy ............... | 74/325 |
| 4,311,067 A | 1/1982 | Froumajou | |
| 4,543,011 A | 9/1985 | Lindenthal | |
| 4,771,648 A | 9/1988 | Bardoll | |
| 5,107,951 A | 4/1992 | Kawamura | |
| 5,180,249 A | 1/1993 | Hanser et al. | |
| 5,404,772 A | 4/1995 | Jester | |
| 5,503,039 A | 4/1996 | Bailly et al. | |
| 5,915,512 A * | 6/1999 | Adamis et al. .............. | 192/3.61 |
| 6,544,142 B2 * | 4/2003 | Kobayashi ................... | 477/54 |
| 6,591,705 B1 * | 7/2003 | Reik et al. ................... | 74/343 |
| 6,634,247 B2 | 10/2003 | Pels et al. | |
| 6,675,668 B2 | 1/2004 | Schamscha | |
| 6,830,528 B2 | 12/2004 | Yamada | |
| 7,155,994 B2 | 1/2007 | Gumpoltsberger | |
| 7,225,695 B2 * | 6/2007 | Gumpoltsberger et al. .... | 74/325 |
| 2004/0025612 A1 * | 2/2004 | Ahnert et al. ................. | 74/329 |
| 2004/0093972 A1 | 5/2004 | Gumpoltsberger et al. | |
| 2004/0162180 A1 | 8/2004 | Gumpoltsberger et al. | |

FOREIGN PATENT DOCUMENTS

| | | |
|---|---|---|
| DE | 371 153 | 3/1923 |
| DE | 1 934 100 | 6/1971 |
| DE | 2 344 797 | 3/1974 |

(Continued)

*Primary Examiner*—Roger Pang
(74) *Attorney, Agent, or Firm*—Davis & Bujold, P.L.L.C.

(57) ABSTRACT

A transmission structure for a transmission (1, 48) having at least one starting element (2, 49), at least one transmission input shaft (4, 5, 50), one countershaft (22), at least one output shaft (41), fixed and idler gear wheels fastened or rotatably supported on the shaft, shifting sets (20, 21, 37, 39) coordinated with the idler gears, the same as roller bearings for support of the shafts, roller bearings (18, 24) being situated in a central bearing plane (D) which divides the fixed and idler gears coordinated with them in two gear groups. For further development of such a transmission, it is proposed that directly close to the roller bearings (18, 24) of the central bearing plane (D), upon at least one transmission input shaft (4, 5, 50) and the countershaft (22), the gear wheels (13, 33) of the first gear (G1) or the gear wheels (13, 30, 32) of the reverse gear (RG) are disposed.

13 Claims, 2 Drawing Sheets

FOREIGN PATENT DOCUMENTS

Figure 1:
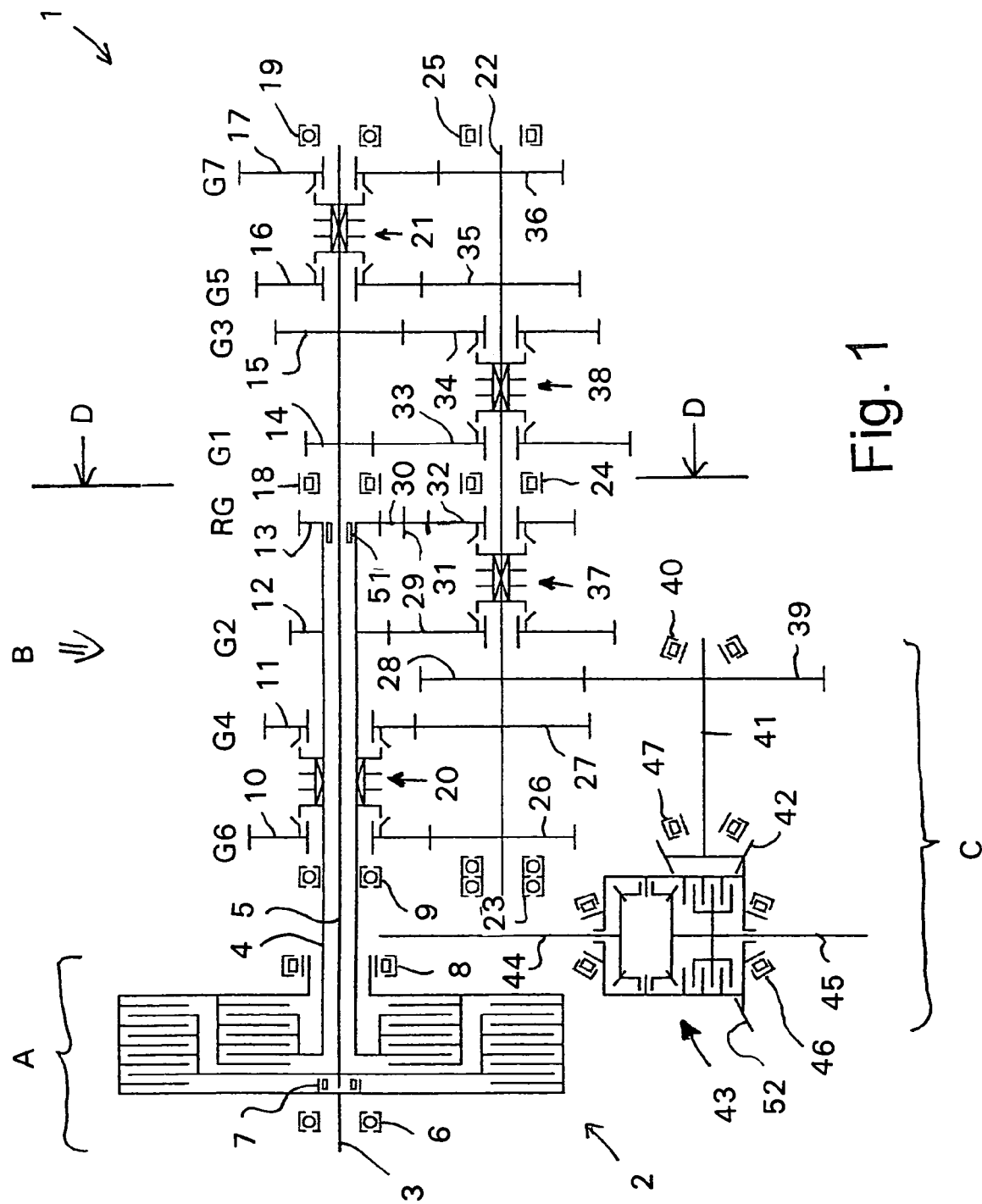

| | | |
|---|---|---|
| DE | 27 15 949 | 9/1978 |
| DE | 30 33 625 A1 | 4/1982 |
| DE | 31 49 156 A1 | 6/1983 |
| DE | 82 10 013 | 12/1983 |
| DE | 34 14 107 A1 | 10/1985 |
| DE | 34 27 226 A1 | 1/1986 |
| DE | 35 46 454 A1 | 2/1987 |
| DE | 37 10 582 A1 | 11/1987 |
| DE | 37 15 880 A1 | 5/1988 |
| DE | 40 12 211 C1 | 10/1991 |
| DE | 41 23 493 A1 | 1/1993 |
| DE | 41 37 143 A1 | 5/1993 |
| DE | 35 46 454 C2 | 3/1994 |
| DE | 4401812 A1 * | 8/1994 |
| DE | 44 36 526 A1 | 10/1995 |
| DE | 298 20 977 | 4/1999 |
| DE | 198 21 164 A1 | 11/1999 |
| DE | 199 44 879 A1 | 3/2001 |
| DE | 199 50 696 A1 | 4/2001 |
| DE | 101 33 695 A1 | 3/2002 |
| DE | 202 12 094 U1 | 11/2002 |
| DE | 102 53 259 A1 | 5/2004 |
| DE | 103 05 241 A1 | 9/2004 |
| DE | 103 05 242 A1 | 9/2004 |
| EP | 0 976 952 A1 | 2/2000 |
| EP | 1 067 312 A1 | 1/2001 |
| EP | 1 077 336 A1 | 2/2001 |
| EP | 1 347 203 A2 | 9/2003 |
| GB | 1 407 130 | 9/1975 |
| GB | 2 258 020 A | 1/1993 |

* cited by examiner

TRANSMISSION STRUCTURE

This application claims priority from German Application Serial No. 103 43 995.1 file Sep. 23,2003.

FIELD OF THE INVENTION

The invention relates to a transmission structure.

BACKGROUND OF THE INVENTION

In DE 35 46 454 C2, the prior art has disclosed a dual-clutch transmission in which the output sides of two axially immediately consecutive starting and gear clutches can be connected with the drive shaft of a prime mover. The output side of one of the two clutches is non-rotatably connected with a hollow shaft which supports one shaft connected with the output side of the other clutch. Besides gear wheels for the second and the fourth gear are fastened on the hollow shaft, the same as gear wheels for the first gear, the fifth gear, the third gear and the reverse gear are fastened on the free area of the other shaft. These fixed gears of one of each reduction step mesh with coordinated idler gears which are situated on a paraxial countershaft and can be connected with the shaft by means of synchronizer clutches (shifting sets). Each one of the synchronizer clutches is coordinated with two transmission gears. The gear sequence of this transmission, departing from the dual clutch is: second gear, fourth gear, first gear, fifth gear, third gear and reverse gear.

From DE 41 37 143 A1 is, in addition, known a multi-speed synchronized countershaft transmission where the positions of the two gears are each coordinated with one of several shifting sets. The shifting sets are, as a rule, comprised of sliding sleeves which are axially, displaceably, but non-rotatably situated on a transmission shaft and which, during a shifting operation, interacting with synchronizer rings located adjacent to the sleeves, decelerate idler gear wheels and can non-rotatably connect them with the transmission shaft.

In this known transmission, the two gears (first gear and third gear or second gear and fourth gear) coordinated with one shifting set are two non-successive transmission gears. This transmission design has the advantage that thereby is created a transmission shifting system with which an overlapping shift actuation and therewith reduced shifting times are possible but, nevertheless, such a transmission cannot be shifted via a shifting device having one H-shifting gate since, with such a transmission, only immediately consecutive transmission gears can usually be engaged in the same shifting gate.

To overcome the problem, the not pre-published DE 102 53 259.1 has proposed a universally shiftable dual-clutch transmission essentially consisting of one starting unit, one core transmission and one output unit, the starting unit comprising one single clutch, one dual clutch or one torque converter and the output unit containing transmission parts for a front-transverse drive, for a front-longitudinal drive, for a rear-longitudinal drive or for an all-gear drive. The core transmission is designed as countershaft transmission having available at least one input shaft, one countershaft and one transmission output not coaxially aligned with at least one transmission input shaft.

The gear sequence in the transmission is such that, departing from the clutch, there follow first the sixth gear, the second gear, the reverse gear, the seventh, the fifth, the third and the first gears. The fixed gears of the fourth, sixth, second and of the reverse gears are non-rotatably fastened on one hollow shaft connected with the output side of one of the two clutches of a dual clutch, while the fixed gears of the seventh, of the fifth, of the third and of the first gears are fastened on a shaft coaxially supported in the hollow shaft and connected with the output side of the second clutch of the dual clutch.

The two transmission input shafts are supported by means of roller bearings situated between the dual clutch and the gear wheel for the first gear, at the end of the hollow shaft between the gear wheels for the reverse gear and the seventh gear and, on the free end of the second transmission input shaft, supported in the hollow shaft. The same is provided for the countershaft. In addition, it is to be stated that the output of the countershaft is tied to the beginning or end thereof according to drive technology.

Against this background, the problem on which the invention is based is to introduce a transmission structure which can be used for automatic dual-clutch transmissions, automated countershaft transmissions with one clutch and simply, manually shiftable countershaft transmissions and, which compared to the prior art, has a simple constructional design, short length and an improvement relative to the support of the transmission shafts.

SUMMARY OF THE INVENTION

Particularly in motor vehicle transmissions having two input shafts coaxial with each other, the transmission input shaft supported in a hollow shaft, as a rule, has a comparatively small diameter. Due to the gearing forces acting on the shaft and produced by the toothing contact of the gear wheels, undesired bending forces which have to be reduced are exerted upon the shaft.

With this background, the invention is based on the knowledge that the arrangement of the gear wheels, having the highest ratio and therewith the lowest number of gears in the center of the core transmission B, is necessary for limiting the mechanical stress of one second transmission input shaft supported in the hollow shaft. As core transmission B is understood here, the part of the whole transmission which is between a starting unit A with the starting element (clutch, dual clutch, torque converter) and one output unit C.

Accordingly, the invention concerns a transmission structure for a transmission having at least one starting element, at least one transmission input shaft, one countershaft and at least one output shaft preferably paraxial with the shafts. Besides, fixed and idler gear wheels are fastened or rotatably supported on the shafts, there being coordinated with the idler gears shifting sets, roller bearings being available for support of both input shafts of the countershaft and of other output shafts.

It is provided in this transmission structure that some of the roller bearings be situated in the central bearing plane D which divides in two gear groups: the fixed and idler gears specifically assigned to gears. The characteristic of this structure is now that the gear wheels, respectively of the first gear G1 and of the reverse gear RG, are disposed immediately close to the roller bearings of the central bearing plane D upon at least one transmission input shaft and the countershaft.

By virtue of the combination of the arrangement of roller bearings for at least one transmission input shaft and the countershaft in the center of the transmission and the arrangement of the gear wheels for the lowest gears as it were to right and left close to the bearings, a transmission of small design and structurally simple is provided. Besides the other shaft bearings can advantageously be made of smaller dimensions due to the preferably large dimensions of the roller bearings in the central bearing plane D.

The inventive transmission structure can be used in a multiplicity of transmission types which have the starting elements consisting of one dual clutch, one single clutch or one hydrodynamic torque converter.

In one advantageous development of the invention, it can be provided that, departing from the central bearing plane D, the number of gears on both transmission input shafts and the countershaft respectively increase in direction to the starting element or in opposite direction.

It is, in addition, deemed very convenient that departing from the central bearing plane D, the gear wheels of even numbered gear is arranged in direction to the starting element and the gear wheels of odd numbered gears in opposite direction.

For a transmission, especially favorably designed within the scope of the invention, a gear sequence is proposed in which, departing from the starting element, there consecutively follow the sixth gear G6, the fourth gear G4, the second gear G2, the reverse gear RG, the first gear G1, the third gear G3, the fifth gear G5 and the seventh gear G7.

However, the inventive transmission structure is mainly, but not exclusively, utilizable in transmissions having two input shafts of which the first is designed as a hollow shaft in which supports the second transmission input shaft.

In another preferred development of the invention, it is provided that behind the free end of the hollow shaft, upon the second transmission input shaft in direction to the free end thereof, there is disposed first, the fixed gears of low gears G1, G3 and then the idler gears of high gears G5, G7.

Upon the hollow shaft itself is again found this arrangement principle wherein, departing from the central bearing plane D in direction to the starting element, first the two fixed gears of the low gears RG, G2 and then the two idler gears of the high gears G4, G6 are disposed.

This gear-arrangement principle is also provided for a countershaft transmission having only one transmission input shaft (FIG. 2) according to which, on the right and left sides of the central bearing plane D, there are respectively disposed consecutively first two fixed gears and then two idler gears.

In this connection, it is worth trying to situate the idler gear for the highest transmission gear G7 on the free end of the second transmission input shaft or of the single transmission input shaft.

In order to be able to non-rotatably connect the idler gears of the different reduction steps with the transmission shaft that carries them, so-called shifting sets are available which essentially comprise synchronization means for rotational speed equalization between shaft and idler gear, the same as sliding sleeves for non-rotatable connection of idler gear and shaft.

In connection with the invention, it is preferably provided that with the idler gears for the sixth gear G6 and for the fourth gear G4, the same as with the idler gears for the fifth gear G5 and the seventh gear G7, a common shifting set is coordinated upon at least one transmission input shaft just as with the idler gears for the second gear G2 and the reverse gear RG, the same as with the idler gears for the first gear G1 and the third gear G3, a common shifting set is coordinated on the countershaft.

Alternative to this can also be provided that with the idler gears of the first gear G1 and of the third gear G3, of the second gear G2 and of the reverse gear RG, the same as of the fourth gear G4 and of the sixth gear G6, a common shifting set is coordinated while, with the idler gears of the fifth gear G5 and of the seventh gear G7, respectively, one individual single acting shifting set is coordinated.

In a second alternative design of this transmission can be provided that with the idler gears of the first gear G1 and of the reverse gear RG, of the third gear G3 and of the fifth gear G5, the same as of the second gear G2 and of the fourth gear G4, respectively, one common shifting set is coordinated, while with the idler gears of the sixth gear G6 and of the seventh gear G7, respectively, one individual and single acting shifting set is coordinated.

A third alternative of the inventive transmission structure provides that with the idler gears of the first gear G1 and of the reverse gear RG, of the third gear G3 and of the fifth gear G5, the same as of the fourth gear G4 and of the sixth gear G6, respective common shifting sets are coordinated while with the idler gears of the second gear G2 and of the seventh gear G7, an individual single acting shifting set is coordinated.

Regarding the preparation of a reverse gear ratio, it is deemed advantageous that the reverse gear idler gear is in tooth contact with a reverse gear wheel non-rotatably fastened on a separate reverse gear shaft.

For output of a drive torque from the countershaft, it is provided that upon the countershaft, one output fixed gear is non-rotatably situated which is in tooth contact with one output shaft. On its other free end, one bevel gear is fastened which meshes with one outer toothing on the housing of a differential transmission.

For a transmission of a vehicle having front-axle drive, it is regarded advantageous that the output fixed gear is situated upon the countershaft between the fixed gear for the fourth gear G4 and the idler gear for the second gear G2.

As long as this transmission is to be provided for a vehicle having rear-axle drive, however, the arrangement of the output fixed gear upon the countershaft between the fixed gears for the fifth gear G5 and the seventh gear G7 can be alternatively advantageous.

With this background, it is pointed out that a transmission having the inventive structure can be used for so-called all-wheel vehicles where the output shaft leads to the front axle and/or to the rear axle of the vehicle and, at the same time, is connected according to drive technology with differential transmissions in the area of the starting element and/or in the area of a vehicle rear axle.

Depending on the structural marginal conditions in the transmission and/or in the drive unit space of the vehicle, it can be provided that the output shaft is situated paraxially or forming an angle of pitch with the two transmission input shafts and the countershaft.

One other development of the invention provides that the output shaft carries one fixed gear which meshes with a fixed gear upon a fourth output shaft, the countershaft and the reverse gear shaft being logically counted as output shaft. On the free end of the fourth output shaft is, in addition, fastened one bevel gear for tooth contact in an outer toothing on a differential transmission housing so that a reversal of direction of rotation is provided.

Let it be finally observed that with an inventively designed core transmission b, it is possible to construct an automatically and/or manually actuatable dual-clutch transmission, an automated shiftable countershaft transmission or a manually actuatable countershaft transmission.

BRIEF SESCRIPTION OF THE DRAWINGS

Figure 2:
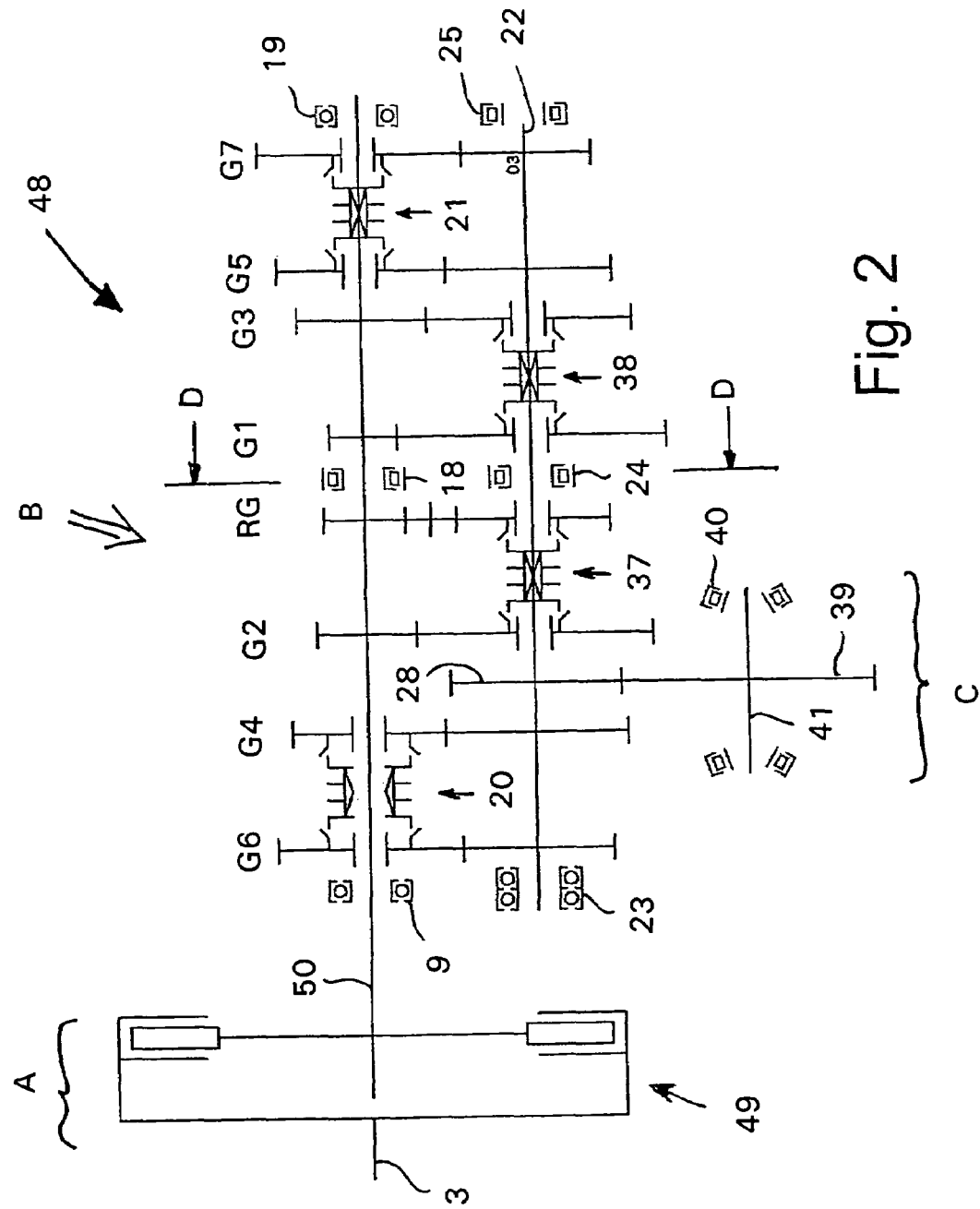

The invention will now be described, by way of example. with reference to the accomnanying drawings in which:

FIG. 1 is a diagrammatic construction of an inventively designed dual-clutch transmission; and FIG. 2 is a diagrammatic construction of an automated shiftable countershaft transmission having one core transmission structure like in the dual-clutch transmission according to FIG. 1.

DETAILED DESCRIPTION OF THE INVENTION

As FIG. 1 accordingly illustrates, a dual-clutch transmission 1 has available one starting unit A, one core transmission B and one output unit C. The starting unit A comprises one dual clutch 2 in which the input sides of the two clutches are connected with a countershaft 3 of an internal combustion engine (not shown). Both clutches are disposed coaxially to each other in a manner known per se, the radially outer clutch being supported by roller bearings 6, 8 on a transmission housing (not shown).

The output side of the radially inner clutch is non-rotatably connected with a first transmission input shaft 4 designed as hollow shaft, while the output side of the radially outer clutch communicates with a second transmission input shaft 5 supported in a hollow shaft 4. For the purpose, for example, on the free end of the hollow shaft 4 is provided one roller bearing 51 which is inserted in the hollow shaft 4 and rotatably supports the second transmission input shaft 5.

The core transmission B is designed as countershaft transmission in which a countershaft 22 is placed paraxially with the two transmission input shafts 4, 5 and acts as first output shaft.

The dual-clutch transmission 1 finally comprises the already mentioned output unit C to which belongs an output shaft 41 for the forward gears and on which are fastened an output gear wheel 39, the same as one bevel gear wheel 42, the latter meshing with a peripheral toothing 52 on the housing of a differential transmission 43. This output unit C will be discussed later.

What the invention concerns now is a transmission structure, that is, the internal design of the core transmission B. As FIG. 1 clearly shows, the dual-clutch transmission 1 appearing here is one with seven forward gears G1 to G7 and one reverse gear RG. The reduction steps forming the transmission gears are implemented with gear wheel pairs which, by roller bearings 18, 24, respectively, for the second transmission input shaft 5 and for the countershaft 22 and situated in a central gearing plane D, are divided in two groups of equal size of transmission gears.

These gear groups are composed so that the gear wheels of even numbered gears are disposed between the dual clutch 2 and the central bearing plane D and, in the other gear group, the gear wheels of odd numbered transmission gears. There exists the characteristic that in both gear groups the respective reduction ratio lowers away from the central bearing plane D and the number of gears increases. Accordingly, between the central bearing plane D and the dual clutch, the gear wheels are in the sequence for the reverse gear RG, the second gear G2, the fourth gear G4 and the sixth gear G6. On the other hand, in the other gear group, departing from the central bearing plane D, the gear wheels are disposed in the sequence: for the first transmission gear G1, the third gear G3, the fifth gear G5 and the seventh gear G7.

Even though the following already results from the gear sequence described, for the sake of clarity, it must again be observed that directly on the right and left sides of the two central bearings 18 and 24 are respectively arranged gear wheels 13, 30, 32 for the reverse gear RG and 14, 33 for the first gear G1. By virtue of this design, it is possible better than in the transmission of the prior art to absorb the shaft bendings resulting form gearing forces. Here obviously assist also roller bearings 9, 19, 23, 25 on the first transmission input shaft (hollow shaft 4), the free end of the second transmission input shaft 4 as well as on the countershaft 22.

FIG. 1 also shows that immediately on the right and left sides of the roller bearings 18, 24 in the central bearing plane D, both on the hollow shaft 4 and on the second transmission input shaft 5, the gear wheels are designed as fixed gears 12, 13 for the reverse gear RG and the second gear G2 or as fixed gears 14, 15 for the first gear G1 and the third gear G3. The fixed gears 12, 13, 14, 15 mesh here with idler gears 29, 32, 33, 34 coordinated therewith upon the countershaft 22.

Regarding the gearwheel pairings for the remaining transmission gears, the arrangement is reverse. Thus, idler gears 10, 11 for the sixth gear G6 and the fourth gear G4, which mesh with coordinated fixed gears 26, 27 upon the countershaft 22 are between the dual clutch 2 and the central bearing plane D on the first transmission input shaft 4. Besides, upon the second transmission input shaft 5, in the area of its free end, are situated idler gears 16, 17 for the fifth gear G5 and for the seventh gear G7 which are in tooth contact with respectively coordinated fixed gears 35 or 36 on the countershaft 22.

As the representation of the transmission structure in FIG. 1 shows, the dual-clutch transmission 1 has also available synchronization and coupling means known per se for the idler gears with the aid of which, for engaging and shifting a selected transmission gear, a rotational speed uniformity is adjusted between the respective idler gear and the transmission shaft 4, 5, 22. Such synchronization means can be a synchronizer ring which is pushed by a sliding sleeve axially upon a brake surface of an idler gear. Under rotational speed uniformity, by axial displacement of the sliding sleeve, a non-rotatable connection is created between the transmission shaft and the idler gear. Those synchronization coupling means are combined in a manner known to form so-called shifting sets with which each two adjacent idler gears can be shifted.

Of special interest in this transmission structure is now that one such shifting set 20 is situated between the idler gears for the sixth gear G6 and the fourth gear G4 on the hollow shaft 4, one shifting set 21 on the second transmission input shaft 5 between the fifth gear G5 and the seventh gear G7, one shifting set 37 on the countershaft 22 between the second gear G2 and the reverse gear RG, the same as one fourth shifting set 38 on the countershaft 22 between the first gear G1 and the third gear G3.

Furthermore, the transmission 1 can also be designed with the alternative coordinations of shifting sets with transmission idler gears mentioned at the start of the short description of the invention, the embodiments always having two gear wheel pairs each having individual, synchronization and coupling means acting only upon one idler gear. Even though this is not always advantageous for reasons of cost and installation space, still it is not to be evaded due to other transmission design parameters. It thereby becomes clear that independent of the arrangement of the shifting sets use is nevertheless made of the basic idea according to which the lowest transmission gears have always to be located close to the bearings 18, 24 on the central bearing plane D.

As to the output from the countershaft 22 to the drive wheels of a motor vehicle, the dual-clutch transmission 1 illustrated, by way of example, shows one output fixed gear 28 upon the countershaft 22 which meshes with one output gear wheel 39 fastened to a transmission output shaft 41 for the forward gears. This transmission output shaft 41 is here aligned paraxially with the two transmission input shafts 4, 5, the same as with the countershaft 22 but, depending on certain standards, it can also be aligned in the transmission housing forming an angle with the shafts 4, 5.

On the end of the output shaft 41 pointing away from the output gear wheel 39 is fastened one bevel gear 42 which, in a manner known per se, is in tooth contact with another toothing 52 on the housing of the already mentioned differential transmission 43. Let it also be mentioned that the output shaft 41 is supported in the transmission housing by roller bearings 40, 47 which can absorb axial and radial forces.

As already known, the differential transmission 43 is for its part supported by roller bearings 46 in the transmission housing and drives axle drive shafts 44, 45 connected with the front wheels, (not shown) of a vehicle.

Insofar as this dual-clutch transmission 1 is to be provided for a vehicle having rear drive, the output fixed gear, for shortening the length of the output shaft 41, is preferably fastened between the gear wheels 35, 36 for the fifth gear G5 and for the seventh gear G7 on the countershaft 22. But it is not ruled out that the output shaft 41 extends to the vehicle front axle and to the vehicle rear axle to drive on both axles respectively one differential transmission (not shown).

It is possible that one other output shaft is available (not shown here), the fixed gear of which meshes with the output gear wheel 39 upon the second output shaft 41. By virtue of this construction, a reversal of direction of rotation is implemented in the output (not shown).

FIG. 2 finally shows that the inventive transmission structure, the same as to a great extent also the design of the core transmission B itself, can be used with no great technical difficulties for a countershaft transmission 48 having only one starting and gear clutch 49. This clutch 49 is connected on its output side with a transmission input shaft 50 supported in the transmission housing via the roller bearings 9, 18, 19 known already from the dual-clutch transmission 1. Situated paraxially with this single transmission input shaft 50, the countershaft 22 of the dual-clutch transmission 1 is also used in a transmission 48.

For a better understanding, a series of reference numerals has been omitted in this representation. But the expert realizes also that the gear sequence G6, G4, G2, RG, G1, G3, G5, G7 in the countershaft 48, according to FIG. 2, is identical with the one in the dual-clutch transmission 1 of FIG. 1.

The same applies also to the arrangement of the central bearings 18, 24 in the central bearing plane D and the distribution of the shifting sets 20, 21, 37, 38. In FIG. 2 has, in addition, been shortened the likewise identical output unit C of which here, for better understanding, only the transmission output shaft 41 with the output gear wheel 39 are shown.

As can easily be inferred from the Figure of this countershaft transmission 48, it can be advantageously used as a normal hand selector transmission or as an automated selector and shiftable countershaft transmission. Despite the axial adjacency of not consecutive transmission gears, even an H-gear selector diagram can advantageously be used which can be implemented by the transmission selector and the shifting devices object of other patent application of the patentee.

It is now easily understandable for an expert that by the selected transmission structure most of the transmission parts can be used without gear changes both for a dual-clutch transmission 1 and for manually and/or automated shiftable countershaft transmissions. This constitutes a great advantage in cost in the production of those transmissions, the same as in the storage of related spare parts.

REFERENCE NUMERALS 1 dual-clutch transmission
2 dual clutch; starting element
3 countershaft
4 hollow shaft;
5 drive shaft
6 roller bearing
7 roller bearing
8 roller bearing
9 roller bearing
10 idler gear
11 idler gear
12 fixed gear
13 fixed gear
14 fixed gear
15 fixed gear
16 idler gear
17 idler gear
18 roller bearing
20 shifting set
21 shifting set
19 roller gearing
22 countershaft
23 roller bearing
24 roller bearing
25 roller bearing
26 fixed gear
27 fixed gear
28 output fixed gear
29 idler gear
30 reverse gear wheel
31 reverse gear shaft
32 idler gear
33 idler gear
34 idler gear
35 fixed gear
36 fixed gear
37 shifting set
38 shifting set
39 output gear wheel
40 roller bearing
41 output shaft
42 bevel gear
43 differential transmission
44 axle drive shaft
45 axle drive shaft
46 roller bearing
47 roller bearing
48 countershaft automatic transmission
49 starting and gear clutch; starting element
50 transmission input shaft
51 roller bearing in the hollow shaft
52 outer toothing on differential transmission housing
A starting unit
B core transmission
C output unit
D central bearing Diane
G1 first forward gear
G2 second forward gear
G3 third forward gear
G4 fourth forward gear
G5 fifth forward gear
G6 sixth forward gear G7 seventh forward gear
RB reverse gear

The invention claimed is:

1. A transmission structure for one transmission (1, 48) having at least one starting element (2, 49), at least one transmission input shaft (4, 5, 50), one countershaft (22) and at least one output shaft (41), fixed and idler gears fastened or rotatably supported on said shafts, shifting sets (20, 21, 37, 38) coordinated with said idler shafts for support of said shafts (4, 5, 50, 22, 41), roller bearings (18, 24) being situated in a central bearing plane (D) which separates the fixed and idler gears coordinated with each other into two gear groups, wherein gear wheels (14, 33) of a first gear (G1) and gear wheels (13, 30, 32) of a reverse gear (RG) are situated close to the roller bearings (18, 24) of the central bearing plane (D) upon the at least one transmission input shaft (4,5,20) and the countershaft (22), and upon the transmission input shaft (50), on a right side of the central bearing plane (D), two fixed gears and then two idler gears are consecutively disposed and, on a left side of the central bearing plane (D), two fixed gears and then two idler gears are consecutively disposed.

2. The transmission structure according to claim 1, wherein the starting element is designed as one of a dual clutch (2), a single clutch (49), and a hydrodynamic torque converter.

3. The transmission structure according to claim 1 wherein, departing from the central bearing plane (D), gear numbers on the at least one transmission input shaft (4, 5, 50) and the countershaft (22) increase respectively in a direction toward the starting element (2, 49) and in an opposite direction.

4. The transmission structure according to claim 1 wherein, departing from the central bearing plane (D), the gear wheels of the reverse gear (RG) and of the second gear, a fourth gear and a sixth gear (G2, G4, G6) are disposed in a direction toward the starting element (2, 49) and gear wheels of the first gear, a third gear, a fifth gear and a seventh gear (G1, G3, G5, G7) in opposite direction.

5. The transmission structure according to claim 1 wherein, departing from the starting element (2, 49), a gear sequence a sixth gear (G6), a fourth gear (G4), the second gear (G2), the reverse gear (RG), the first gear (G1), a third gear (G3), a fifth gear (G5) and a seventh gear (G7).

6. The transmission structure according to claim 1, wherein with idler gears (10, 11) for a sixth gear (G6) and a fourth gear (G4), one common shifting set (20) is coordinated.

7. The transmission structure according to claim 1, wherein with idler gears (16,17) for a fifth gear (G5) and a seventh gear (G7), one common shifting set (21) is coordinated.

8. The transmission structure according to claim 1, wherein with idler gears (29, 32) for the second gear (G2) and the reverse gear (RG), upon the countershaft (22), a first common shifting set (37) is coordinated.

9. The transmission structure according to claim 1, wherein with idler gears (33, 34) for the first gear (G1) and the third gear (G3), upon the countershaft (22), one common shifting set (38) is coordinated.

10. The transmission armture according to claim 1, wherein a reverse idler gear (32) is in tooth contact with a reverse gear wheel (30).

11. The transmission structure according to claim 1, wherein an output fixed gear (28) is situated upon the countershaft (22) between a fixed gear (27) for a fourth gear (G4) and an idler gear (29) for the second gear (G2).

12. The transmission structure according to claim 1, wherein the output shaft (41) leads to at least one of a front axle and a rear axle of a vehicle.

13. The transmission structure according to claim 1, wherein the output shaft (41) is aligned paraxially or forming one pitch angle with at least one transmission input shaft (4, 5, 50) and the countershaft (22).

* * * * *